US007072669B1

(12) United States Patent
Duckworth (10) Patent No.: US 7,072,669 B1
(45) Date of Patent: Jul. 4, 2006

(54) METHOD FOR LOCALIZING THE POSITION OF A WIRELESS DEVICE

(75) Inventor: Gregory L. Duckworth, Belmont, MA (US)

(73) Assignee: Verizon Corporate Services Group Inc., New York, NY (US)

( * ) Notice: Subject to any disclaimer, the term of this patent is extended or adjusted under 35 U.S.C. 154(b) by 271 days.

(21) Appl. No.: 10/444,336

(22) Filed: May 23, 2003

(51) Int. Cl.
*H04B 1/38* (2006.01)

(52) U.S. Cl. ............................ 455/456.1; 455/456.3; 455/456.5; 455/404.2; 455/65; 455/63.4

(58) Field of Classification Search ............ 455/456.1, 455/456.3, 456.5, 404.2, 65, 63.4
See application file for complete search history.

(56) References Cited

U.S. PATENT DOCUMENTS

| | | | |
|---|---|---|---|
| 5,519,760 A | 5/1996 | Borkowski et al. ............ 379/59 |
| 5,930,202 A | 7/1999 | Duckworth et al. ......... 367/127 |
| 6,225,901 B1* | 5/2001 | Kail, IV ................ 340/539.11 |
| 6,266,014 B1* | 7/2001 | Fattouche et al. .......... 342/450 |
| 6,470,186 B1* | 10/2002 | Whikehart et al. ....... 455/456.1 |
| 6,484,031 B1* | 11/2002 | Ruutu et al. .............. 455/456.1 |
| 6,522,890 B1* | 2/2003 | Drane et al. .............. 455/456.5 |
| 2003/0216142 A1* | 11/2003 | Wigren ..................... 455/456.1 |

OTHER PUBLICATIONS

Haynes, Toby, B.A., "Digital Beamforming Primer," Haynes Electronics, pp. 1-18, Nov. 2001.

Orr, John et al., "Developing a System for Tracking and Locating Personnel in Hostile Environments," Electrical and Computer Engineering Department, Worcester Polytechnic Institute, (slide printouts) pp. 1-27, Sep. 13, 2001.

"White Paper: Target Location Using Low Poer Transceiver Technology," (author unknown), Feb. 15, 2000.

Ready, Michael J. Dr., et al., "System Architectures for Narrowband Reconnaissance Receivers and Beamforming Applications," DSP & Multimedia Technology, pp. 1-6, May/Jun. 1998.

\* cited by examiner

*Primary Examiner*—Lester G. Kincaid
*Assistant Examiner*—Fred A. Casca
(74) *Attorney, Agent, or Firm*—Leonard C. Suchyta, Esq.; Joseph R. Palmieri, Esq.

(57) ABSTRACT

Systems and methods for localizing the position of a wireless device using a plurality of coordinated highly directional or adaptive antennas to detect signals from the wireless device. Because of the directional nature and/or adaptive processing of the antennas, off-angle multipath signals resulting from reflection and scattering as the wireless signal propagates through a cluttered environment are rejected by the antennas and processing. As a result, the antennas pass primarily direct path signals from the wireless device to the location estimator. The time of arrival of the signal and the angle of arrival at each antenna are used to in the location estimator to calculate the position of the wireless device. Various robust inversion techniques may also be applied to the data to minimize the effect of residual multipath-corrupted detections. Furthermore, the systems and methods include specialized wireless devices that provide locating signals and signals related to the biological condition of their owner.

12 Claims, 12 Drawing Sheets

FIGURE 9 beam direction
and antenna
locations ↓ N  $\tau_{ij}$  ↓ M

$\underline{\tau}$ = vector of $\tau_{ij}$ $\hat{\underline{x}} = \mathcal{L}_1^{-1}\{\underline{\tau} = F(\underline{x})\}$

100 use iteratively re-weighted
least squares solution to solve
nonlinear equation for wireless
device location $\hat{\underline{x}} = (x, y, z)$
using $\mathcal{L}_1 = \min |\hat{\tau} - \tau|$
$\hat{\tau} = F(\underline{x})$ ↓
$\hat{\underline{x}}$

PRIOR ART

FIGURE 12

METHOD FOR LOCALIZING THE POSITION OF A WIRELESS DEVICE

FIELD OF THE INVENTION

The present invention relates to wireless communications and, more particularly, to systems and methods for localizing the position of a wireless device.

BACKGROUND OF THE INVENTION

The ability to determine the location or position of a wireless device has become increasingly desirable as an ever increasing number of people carry wireless devices, such as mobile phones, pagers, wireless email/Internet devices, and communications radios on a daily basis. In most cases, because individuals carry the wireless devices on or about their person, it is a reasonable assumption that the position of a particular wireless device is also that of its owner. As a result, locating an individual may be accomplished by locating the wireless device they carry. The ability to locate individuals by determining the position of a wireless device has a variety of applications including search and rescue operations, and emergency situations.

Figure 12:
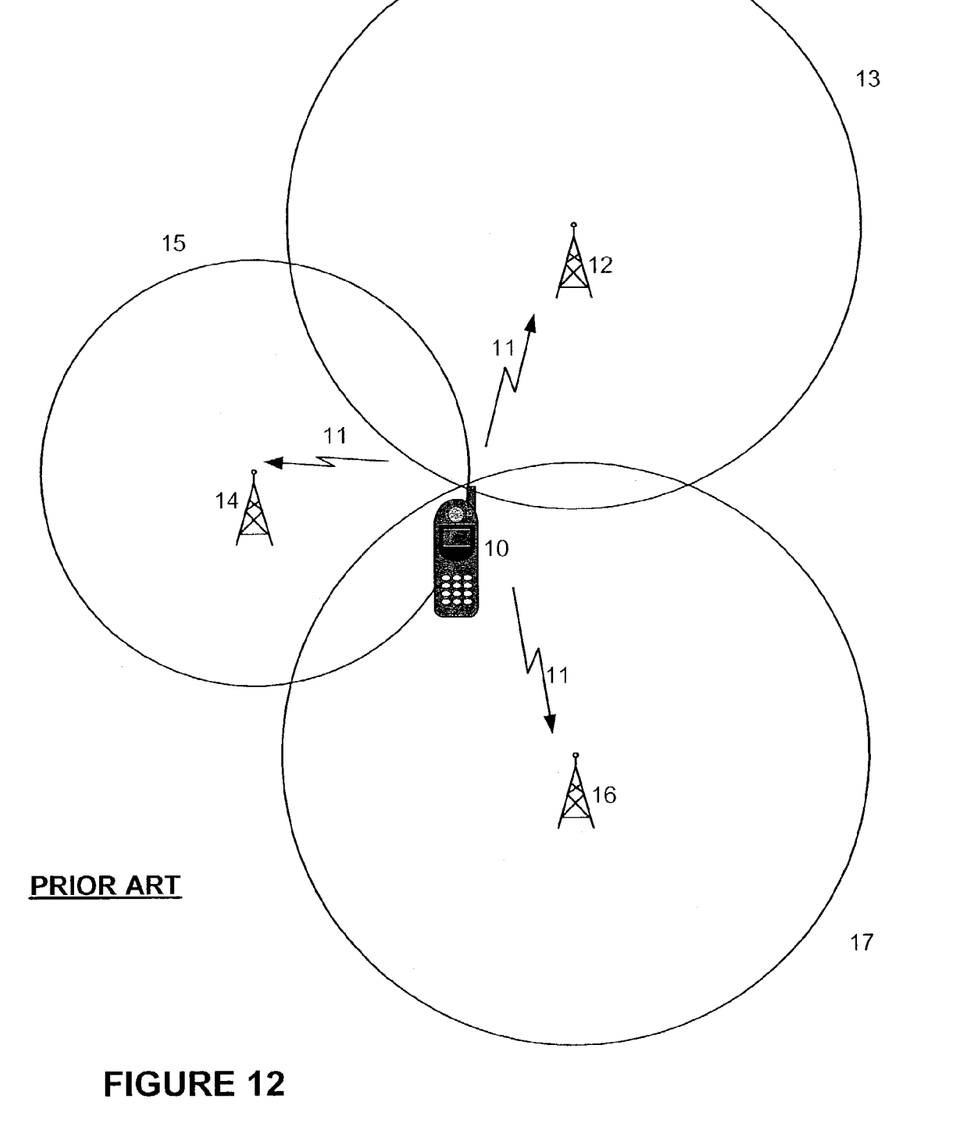
FIG. 12 is a block diagram of a known system for determining the position of a wireless device using time of arrival data.

Though consumer wireless devices generally have voice or data communication as a primary purpose, the signals emitted from such devices can be used to determine the location of the devices. The position can be determined by a number of methods including the known method shown in FIG. 12. The method shown by FIG. 12 determines the location of a wireless device 10 based on the time of arrival of a signal 11 at a series of antennas 12, 14, 16. The path length that the signal 11 travels to each antenna from wireless device 10 determines the time of arrival at each antenna. Based on the time of arrival, the distance between the wireless device 10 and each antenna 12, 14, 16 can be determined. Graphically, circles 13, 15, 17 surrounding each antenna 12, 14, 16 can be created based on the distance determined from the arrival time data. The intersection of these circles indicates the position of the wireless device 10. Alternatively, if the signal transmit time is unknown, time delay of arrival (TDOA) hyperbolic intersection can be used.

To make an accurate calculation of position, the time (delay) of arrival information must be accurately estimated. In complex environments, however, direct paths can be missing and multipath effects from reflection and scattering cause some signals traveling less direct paths to arrive at delayed times. As a result, the discrete arrival times of low bandwidth signals overlap and are smeared out over a period of time making calculation of position based on the arrival times difficult and inaccurate.

For example, known systems and methods have proved inadequate for locating wireless devices buried in the rubble of a collapsed building. The pervasive scattering and reflection from objects in the rubble interrupt the direct propagation path of a wireless device signal and introduce the multipath. These multipath effects make it difficult to determine the arrival time and direction of arrival, upon which known systems rely. As a result, known systems are unable to provide an accurate position of a wireless device buried in the rubble.

Therefore, what is needed are systems and methods for determining the position of a wireless device in a cluttered environment that do not suffer from the disadvantages of known approaches. Such systems would find many applications. In particular, in the example of the collapsed building rubble discussed above, the ability to locate a wireless device buried within the rubble would greatly assist in rescue efforts. Because of the likely proximity of a person to their wireless device, locating the wireless device would often yield the location of the person. Knowing the location of the person would allow recovery crews to focus excavation and recovery efforts on areas likely to have survivors.

SUMMARY OF THE INVENTION

In accordance with the present invention, there is provided a method for localizing the position of a wireless device comprising providing a plurality of directional antennas capable of receiving signals from a wireless device, wherein each antenna produces a scan beam using an adaptive beamformer; providing a control system electronically linked to each of the antennas; determining a time of arrival at each antenna of a signal from the wireless device; and determining a position of the wireless device based on the time of arrival at each antenna.

Also in accordance with the present invention, there is provided a system for localizing the position of a wireless device comprising a plurality of directional antennas capable of receiving signals from a wireless device, wherein each antenna produces a scan beam using an adaptive beamformer; and a control system electronically linked to each of the antennas; wherein the control system is adapted to determine a time of arrival at each antenna of a signal from the wireless device; and determine a position of the wireless device based on the time of arrival at each antenna.

Further in accordance with the present invention, there is provided a method of finding a wireless device in debris comprising providing a control system; providing a plurality of directional antennas, each capable of creating a scan beam and linked electronically to the control system; arranging the plurality of directional antennas near debris in which a wireless device is located; determining the location of each of the directional antennas; coordinating the beams of the directional antennas such that the scan beams converge at a specified location in space; scanning the debris volume for signals from a wireless device; determining the arrival time at each directional antenna when a signal is detected; applying specific robust inversion techniques to eliminate globally wrong detections; and determining a position based on the arrival time.

Also in accordance with the present invention, there is provided a system for localizing the position of a wireless device comprising means for receiving signals from a wireless device, wherein the means produce a scan beam using an adaptive beamformer; means for determining a time of arrival at each antenna of a signal from the wireless device; and means for determining a position of the wireless device based on the time of arrival at each antenna.

It is to be understood that both the foregoing general description and the following detailed description are exemplary and explanatory only and are not restrictive of the invention, as claimed. Additional features and advantages of the invention will be set forth in part in the description which follows, and in part will be obvious from the description, or may be learned by practice of the invention.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION

Reference will now be made in detail to the present embodiments of the invention, examples of which are illustrated in the accompanying drawings. Wherever possible, the same reference numbers will be used throughout the drawings to refer to the same or like parts.

The present invention relates to wireless communications and, more particularly, to systems and methods for localizing the position of a wireless device, such as mobile phones, pagers, wireless email/Internet devices, and communications radios. The present invention uses coordinated adaptive nulling of multipath on a plurality of antennas or a plurality of coordinated highly directional antennas to provide multipath-free direct signals from a transmitter in a given search volume. Reception of off-angle multipath signals resulting from reflection and scattering as the wireless signal propagates through a complex environment are minimized. The arrival time and the angle of arrival of the direct path signals can be accurately estimated. The time of arrival of the signal and the angle of arrival at each antenna is used to calculate the position of the wireless device. Robust inversion (estimation) techniques may also be applied to the data to minimize the effect of residual incorrect detections on multipath. Furthermore, the present invention includes specialized wireless devices that provide locating signals and signals related to the biological condition of their owner.

Figure 1:
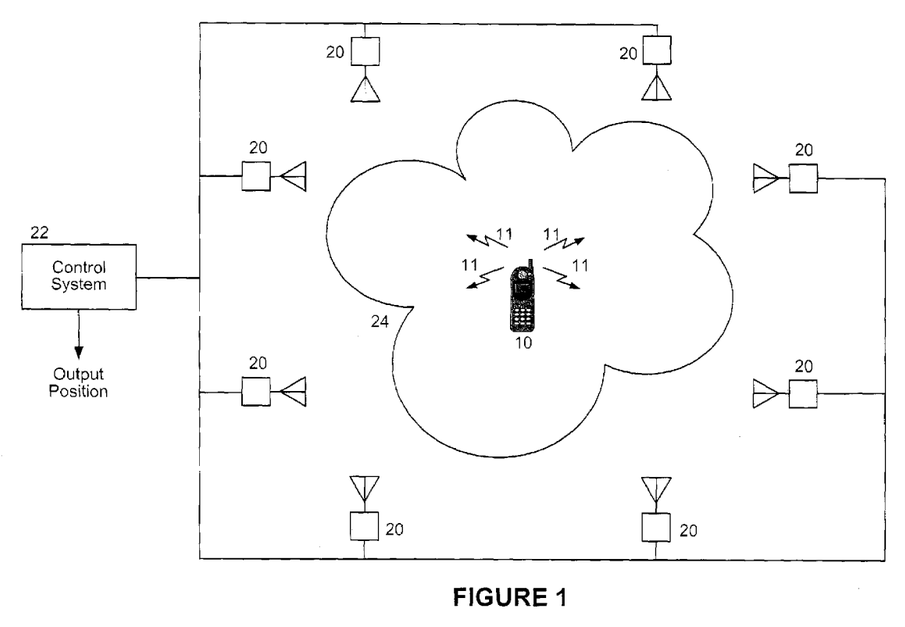
FIG. 1 is a block diagram of a system for localizing the position of a wireless device according to the present invention.

FIG. 1 is a block diagram of an embodiment of a wireless device localization system according to the present invention. The system comprises a plurality of directional receiver antennas 20 linked, wirelessly or by cable, to a control system 22. The antennas are positioned at known locations and orientations surrounding a geographical area 24 (search volume) containing a wireless device 10, the position of which is to be determined. The antennas 20 are directional and may have a narrow scan beam and/or use adaptive beam forming processes. The antennas pass signals from a particular direction while rejecting or suppressing signals from other directions. The scan beams of the antennas are steered electronically or mechanically in a coordinated pattern so that all scan the same volume of space simultaneously. When a signal 11 from a wireless device is detected, the control system 22 uses the accurate arrival time of the signal from each antenna 20 to determine the position of the wireless device 10. The highly directional nature and/or adaptive processing of the antennas 20 eliminates much of the error in arrival time resulting from multipath effects caused by reflection and scattering. Furthermore, the control system 22 applies signal processing using robust inversion techniques to further prevent wrong arrival times from influencing the estimated transmitter location. The system may further incorporate the angle of arrival of the signal at each antenna into the position calculations, although for expected antenna beamwidths, these typically contribute little to the accuracy of the location estimate.

Figure 2:
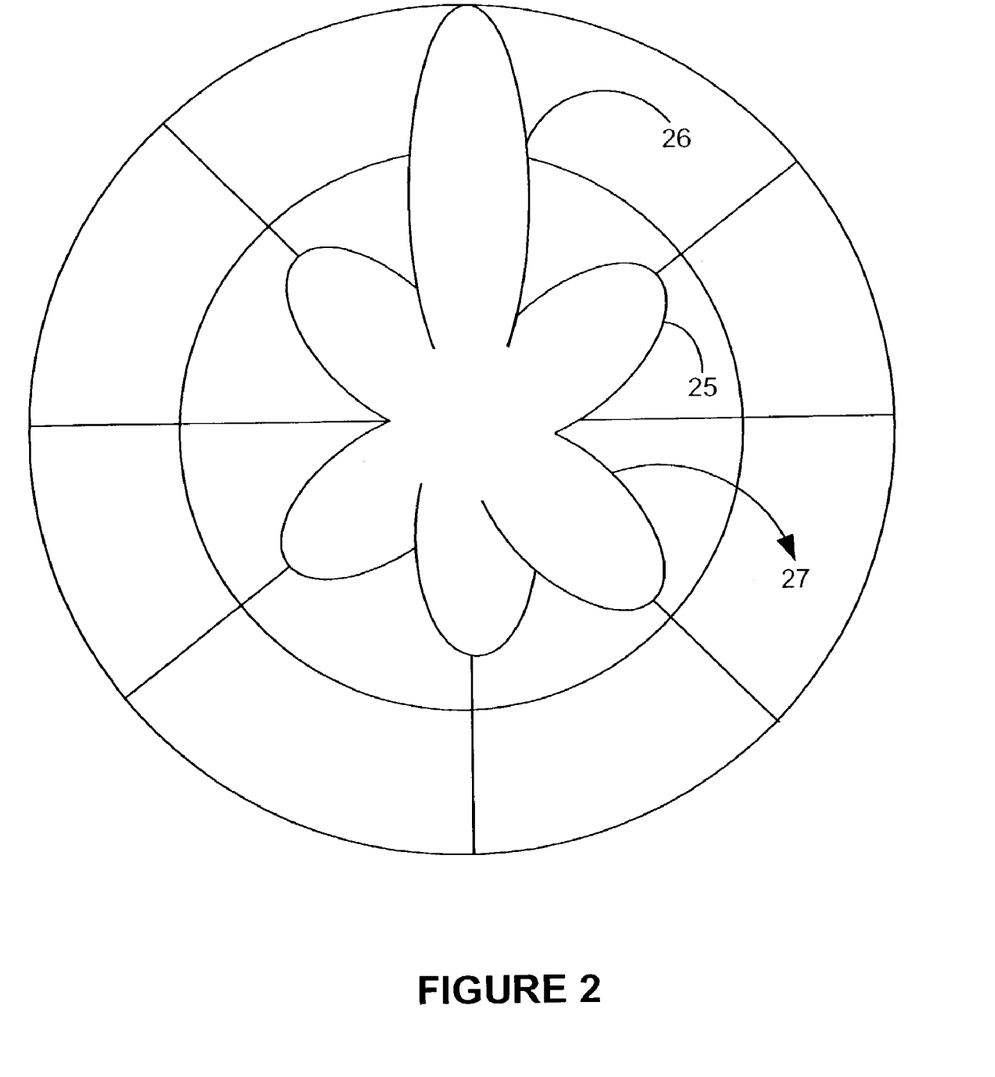
FIG. 2 is a graph of a scan beam of a directional antenna according to the present invention.

The antennas 20 of the present invention are directional antennas that, along with accompanying electronics, have an adequately narrow scan beam to suppress large-delay multipath. The antennas, for instance, may be linear array antennas, sparse linear array antennas, or two-dimensional area antennas. Further, the antennas may employ standard or adaptive beam forming techniques to allow nulling or rejection of signals from other (nearby) angles. FIG. 2 is a graph of a scan beam pattern of an antenna 20 according to the present invention. The origin or center of the graph represents the location of the directional antenna 20. The scan beam has a central lobe 26 and side lobes 27. Between the lobes 26, 27 are nulls 25.

Figure 3:
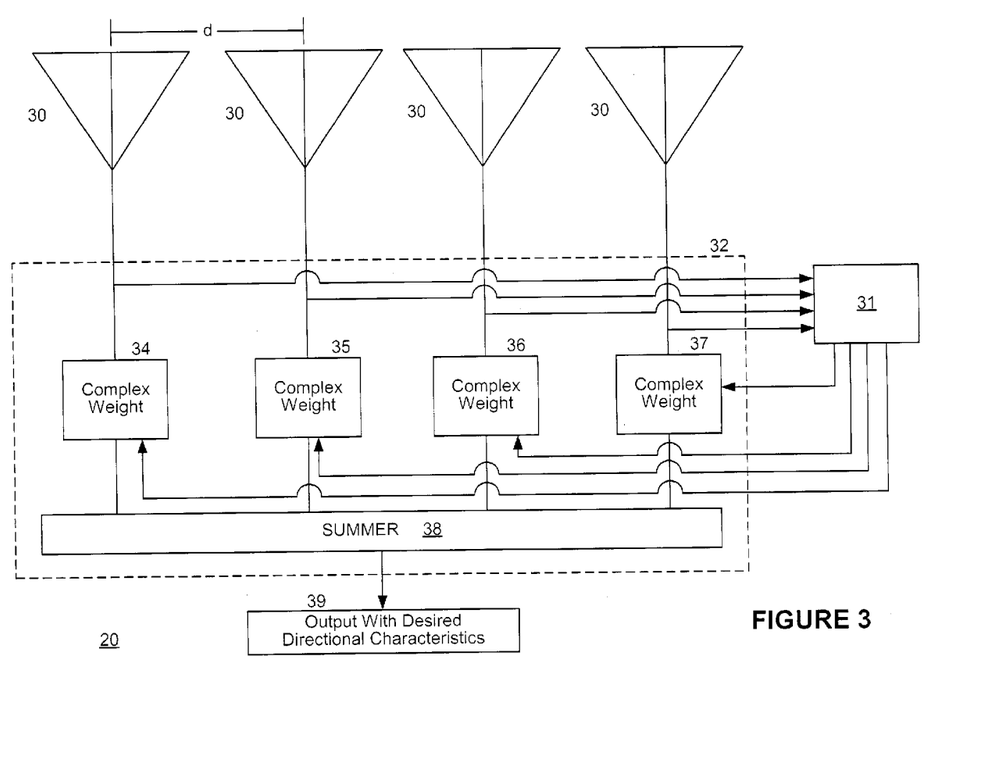
FIG. 3 is an antenna array according to the present invention.

Though various types of known directional antennas, including mechanically steered directional antennas, may be used in the present invention, the antennas are preferably electrically steered antenna arrays which allow adaptive processing. FIG. 3 shows an exemplary antenna array 20 consistent with the present invention. The array 20 has a plurality of antenna elements 30, each separated by a distance d. Each element 30 is connected to the adaptive beamformer 32. The distance d between the antenna elements is generally one half of the transmission wavelength of the wireless device of interest; however, other spacings of elements 30 can also be used. For instance, when adaptive beamforming is used, the spacing may vary because the adaptive processing makes conventional beam forming sidelobe structure unimportant. In particular, it may be advantageous to use non-uniform spacing between elements to allow discrete nulls in multipath directions and to avoid strong grating lobes.

Still referring to FIG. 3, the adaptive beamformer 32 electrically steers the scan beam of the array, such that the antenna is able to "look" for signals arriving from a defined direction, while rejecting signals from other directions. The beamformer applies a set of weights 34, 35, 36, 37, which depend on the desired angle $\ominus$, of the scan beam and the particular multipath environment. These weights are determined by adaptive weight calculator 31 using known adaptive beamforming techniques. The adaptive beamformer 32 then sums the weighted signals from all the elements 30, using a summer 38, into one output 39 that has the desired directional pattern. By varying, over time, the weights 34, 35, 36, 37 applied by the beamformer 32, the scan beam of the antenna can be steered across many potential arrival angles, corresponding to all volume elements of the area to be searched.

Figure 4:
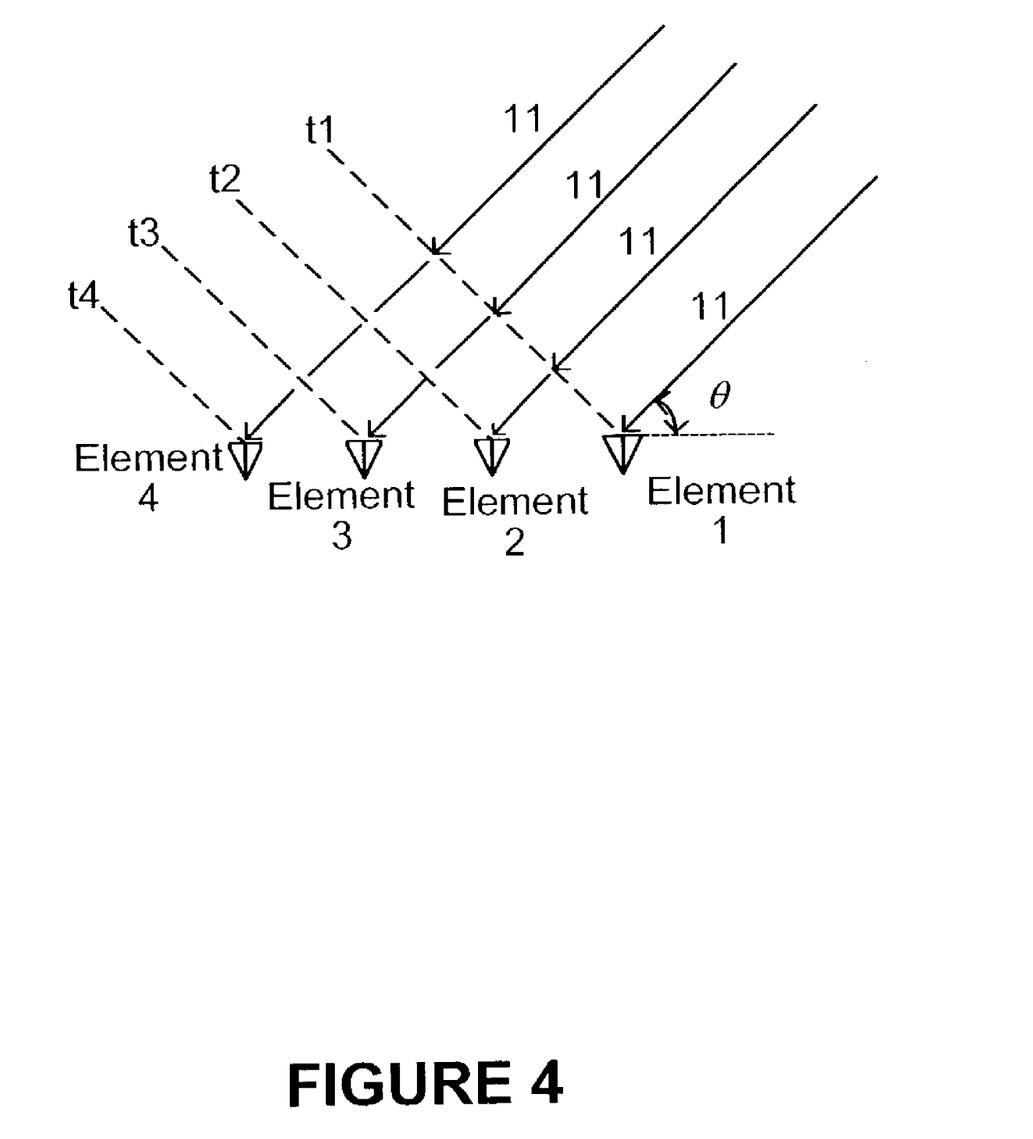
FIG. 4 is a diagram showing a signal incident upon an antenna according to the present invention.

A simplified example of a method of determining weights is explained with reference to FIG. 4. In simplest form, the weights are equivalent to delays applied to incoming signals that correspond to the time interval for an incoming signal from a particular angle to reach a particular antenna element. For example, with the two element antenna array shown in FIG. 4, no delay is applied to the signal 11 received by the first element, while a delay of (d cos ⊖)/c is applied to the signal 11 received by the second element. Here, ⊖ is the desired signal arrival angle, d is the distance between the first and second elements and c is the propagation speed of the signal. The present invention may utilize more complicated determinations of weights. For example, the weights applied to signals from various elements in an array may be chosen to maximize the direct path signal and to create nulls in the directions of multipath signals using well-known means.

As discussed above with reference to FIG. 1, the antennas 20 are generally arranged at spaced apart intervals around the exterior of the volume 24 to be scanned, but other antenna arrangements may be used. Though any number of antennas may be used, at least three are contemplated for the present invention. Additional antennas provide greater sensitivity, performance and robustness. The position and orientation of each antenna 20 relative to the others is known. The position and orientation may be established by any known method such as traditional survey techniques, global positioning system (GPS), RF triangulation, flux gates, compasses, or the like. Instrumentation for establishing the position of each array, such as GPS, may be incorporated into each antenna array. Antenna position accuracy to the order of the location accuracy desired is assumed, and orientation accuracy of the antenna pointing direction is better than $\lambda/2L$ radians accuracy, where $\lambda$ is the RF wavelength of the wireless device to be located, and L is the largest dimension of the antenna.

Figure 5:
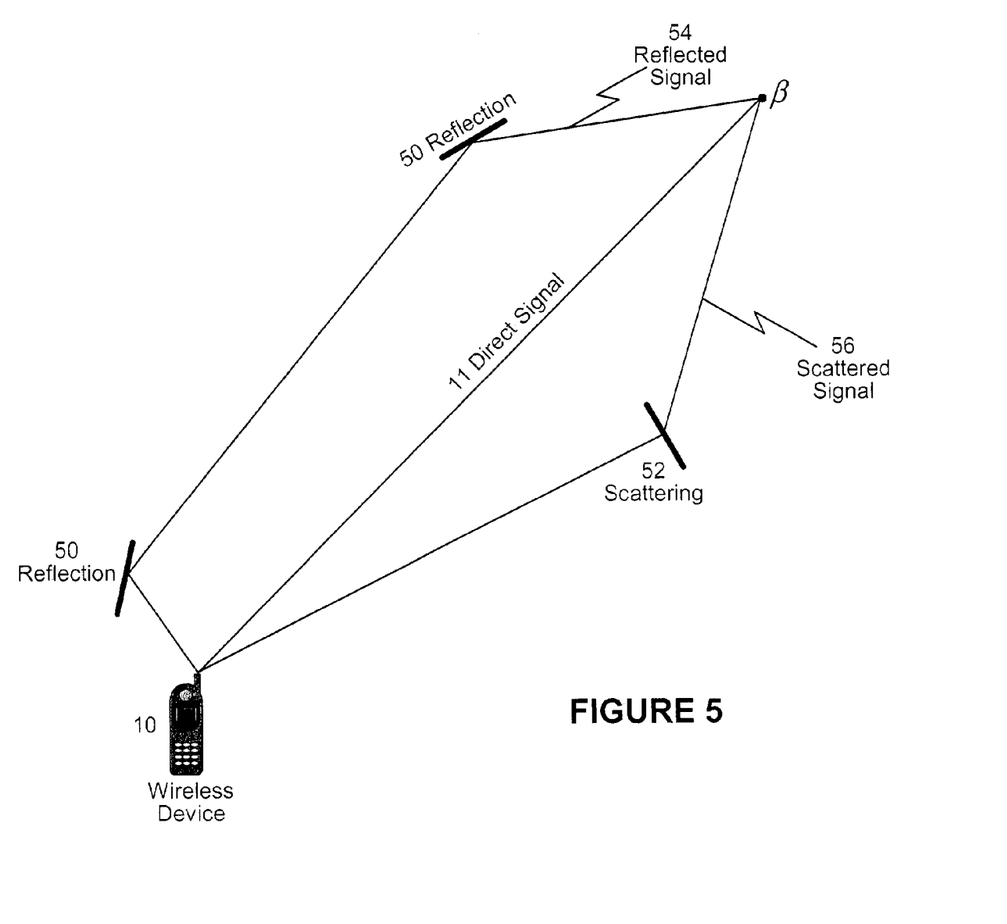
FIG. 5 is a diagram showing wireless signal propagation in a cluttered environment.

Referring to FIG. 5, in a cluttered environment, the signal from a wireless device 10 may be reflected 50 or scattered 52 as it propagates through a cluttered environment such as a building or rubble. As a result, the signal may arrive at a given point B by a variety of paths in addition to the direct path 11. The reflected signals 54 and scattered signals 56 are delayed because they take a longer path from the wireless device 10 to the given point B. Furthermore, these less direct signals arrive at the antenna at angles different from that of direct path 11. The result of these multipath effects is that discrete arrival times of the direct path signals of interest are corrupted by the later arriving multipath. This effect is significant because the bandwidth of most wireless devices is very limited, and the broadening of the arrival time correlation or matched-filter peak in the receiver is on the order of the inverse of this bandwidth, in seconds. For example, the inverse of the bandwidth of a typical cellular phone signal is on the order of hundreds to thousands of meters when converted from time to distance using the speed of light. Thus, scattered paths that differ by only a few meters overlap the arrival peak of the direct path and corrupt the measurement of its arrival time, rendering such detections useless for precision localization.

Figure 6:
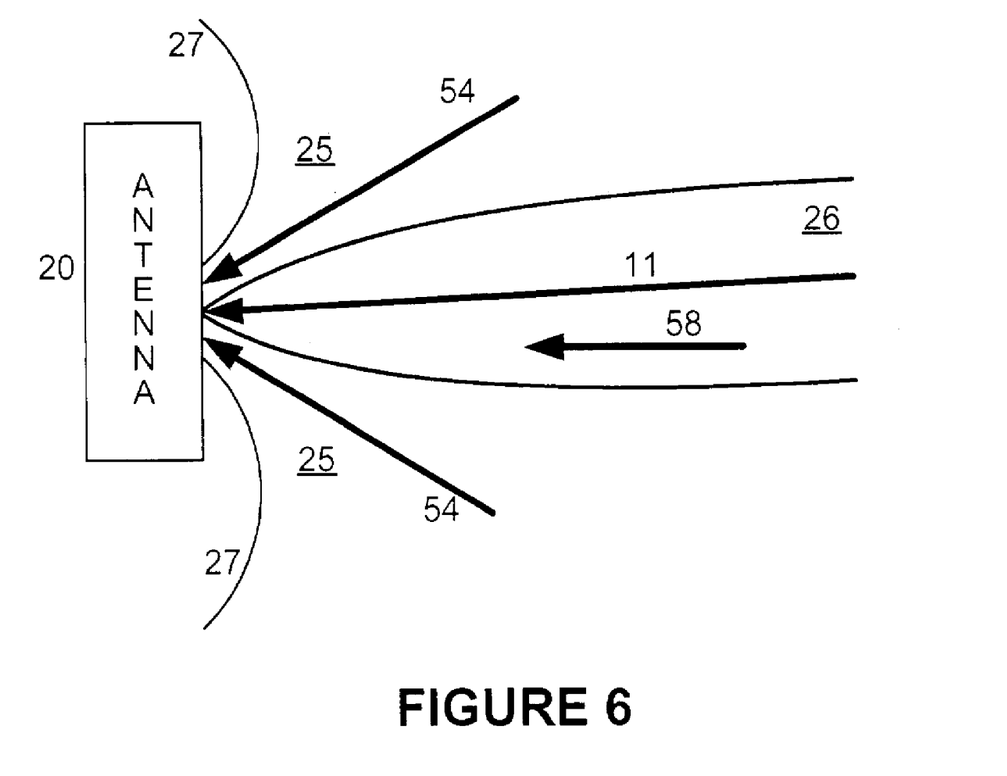
FIG. 6 is an example diagram of a directional antenna according to the present invention.

Referring to FIG. 6, the present invention minimizes these problems by using highly directional antennas 20 that do not "see" the highly-delayed, high-off-angle multipath 54. Instead they receive only the direct signals 11 and the less problematic near-in multipath signals 58. Near-in multipath signals travel paths very close to the path taken by direct path signals. As a result, the near-in multipath arrival times are only slightly larger than the desired direct path arrival times. Thus, while the inclusion of near-in multipath signal arrival times in position calculations does decrease accuracy somewhat, it is not by very much. The directional antennas of the present invention ignore or substantially attenuate off-angle delayed multipath signals 54 that fall outside the primary scan beam 26 (FIG. 2). As a result of eliminating much of the delayed multipath signals 54, the arrival time of the direct path signal 11 at each antenna 20 is more accurate.

Additional techniques and methods are used to further reduce the effects of multipath on the arrival time and subsequent determination of position based on the arrival times. First, the present invention utilizes a plurality of antennas, resulting in the capture of more arrival time data with which to decrease the error of multipath effects and more accurately determine location. In one embodiment, at least four antenna arrays are used to accurately triangulate the position of the wireless device. With excess data, arrival times that are incorrect can be minimized or eliminated using the inversion (estimation) techniques described below, while still having sufficient data to determine the position of the wireless device.

Secondly, the control system may apply a variety of processes to minimize errors and increase the accuracy of the position calculations. The control system is a computer that is capable of controlling and coordinating the scan beams of the antennas, receiving data from the antennas, processing the data and calculating the position of a wireless device based on the data. The control system applies various robust inversion techniques to the arrival time data to decrease the effects of incorrect or delayed arrival time information. Robust inversion techniques are defined in this case as methods of estimating position which are relatively insensitive to data that lies outside some expected distribution. In other words, robust inversion techniques are methods of minimizing corrupted data. An example of such a robust inversion technique is a non-linear iteratively re-weighted least squares method applied in a position calculation according to the present invention. The goal of such processes are to eliminate or minimize errors to the collected data, such as time of arrival data from scattered paths.

For example, the system may apply a variant of the Levenberg-Marquardt method of non-linear least squares that minimizes the minimum absolute value instead of the squared error using an iterative re-weighting technique. This error metric is what makes the inversion "robust" to large errors in the data from arrival times that are significantly distorted due to multipath. It has the property of only using the data from the N measurements that are most consistent with the location hypothesis, where N is the number of unknowns—in our case N=4, the 3-dimensional location of the wireless device and the unknown time of emission. This "robust" property causes it to be very insensitive to "outlier" data corrupted by (occasional) large multipath errors. Reference is made to U.S. Pat. No. 5,930,202 to Duckworth et al., for a more detailed understanding of such inversion techniques, which patent is hereby incorporated herein by reference.

The control system (FIG. 1) uses the time of arrival information from each antenna to determine a position of the wireless device. Because the positions of the antennas and propagation speed of the signal are well known and the arrival time data is largely from direct path signals, the distance from each antenna to the wireless device can be calculated as a function of unknown location and emission time. With 4 or more measurements, the position (three quantities) and the emission time (one quantity), can be estimated, uniquely, thus determining the location of the transmitter. Furthermore, because the antennas are capable of determining the direction from which a particular signal arrived, the position of a wireless device may also be determined geometrically from the arrival angle data from several antennas. As a result, the angle of arrival data may be used to augment time of arrival position calculations by incorporation into calculations of position that include time of arrival data. The centroid of the coordinates of the volume formed by the intersection of the scan beams from each antenna also serves as a useful starting solution for the non-linear iterative robust inversion algorithm.

The system may be used to determine the location of a variety of wireless devices, including but not limited to mobile phones, pagers, wireless email/Internet devices, and communications radios. Some wireless devices, such as mobile phones, transmit only intermittently when not being actively used for communication. To avoid missing these intermittent emissions, the preferred embodiment of the present invention uses a plurality of electrically scanning antennas. This allows all points in the volume to be scanned simultaneously using parallel formation of all beams. The target volume elements are obtained by using only the beams and emission time windows that correspond to each volume. For each of the relatively coarse volume/time elements, the time of arrival solution from a wireless device in the volume element can precisely pinpoint its location. The number of beams required for each antenna depends on the total volume to be scanned, and the resolution of each individual antenna (~λ/2L) radians. Larger antennas will require more beams and more computation, but allow better multipath suppression, and hence better performance. Electronic steering with parallel, rather than sequential beams, not only increases the overall search rate, but reduces the probability that the transient emission of the wireless device will be missed.

Figure 7:
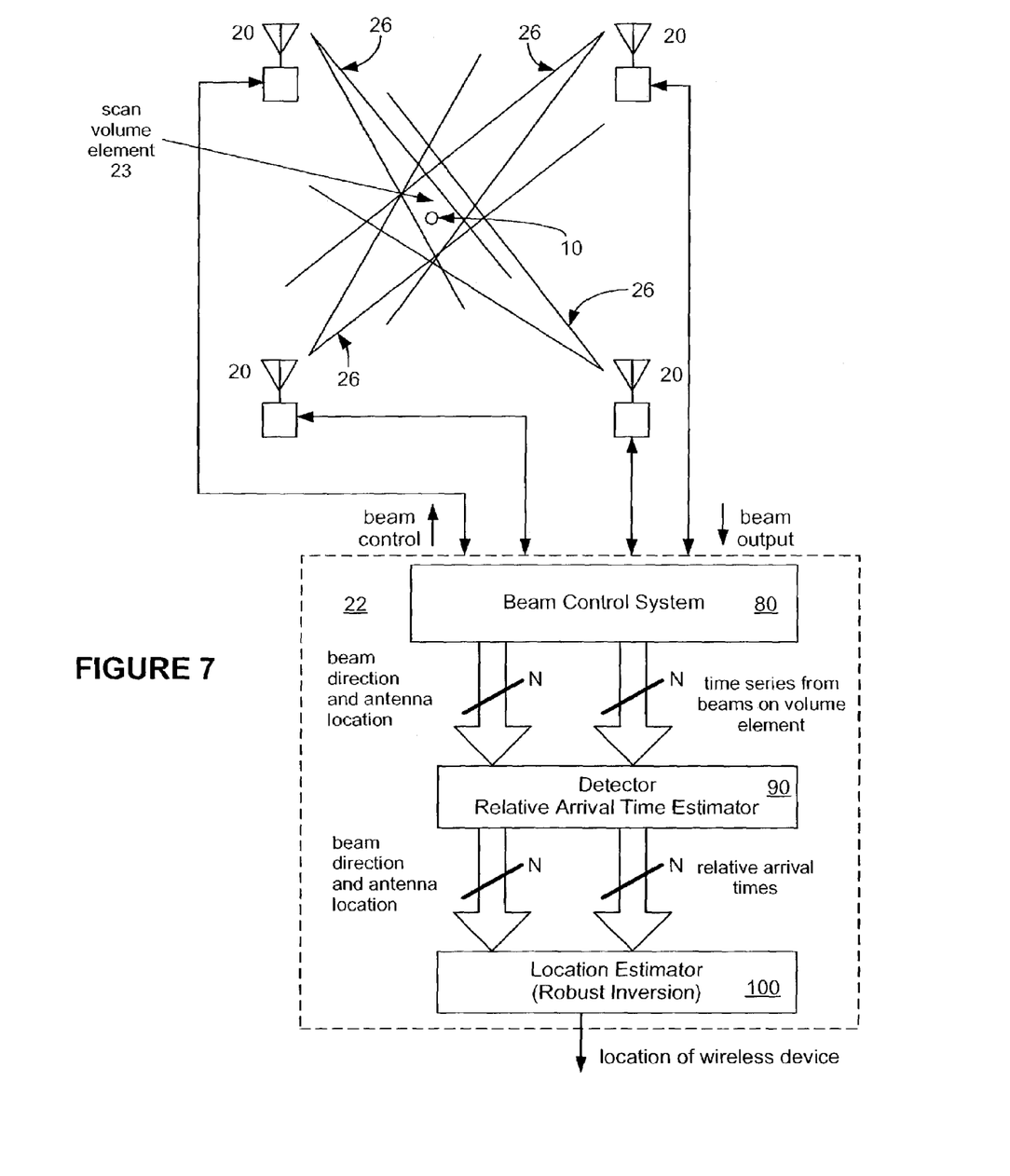
FIG. 7 is a block diagram of a signal processing system according to the present invention.

FIG. 7 is a block diagram of an example of signal processing according to the present invention. A plurality of N antenna arrays 20 (N=4 in FIG. 7) are at known locations around a volume containing one or more wireless devices 10. The antenna arrays can be electrically or mechanically steered and may utilize adaptive or conventional beam forming. An exemplary antenna array is shown in FIG. 3. Each of the N antenna arrays 20 is connected electronically to the control system 22. The control system 22 is preferably a computer programmed to carry out the control and calculation functions discussed in detail below. The control system 22 may alternatively be specialized electronic circuitry designed for carrying out the control and calculation functions described in detail below. The control system 22 includes a beam control system 80, a detector and relative arrival time estimator 90, and a location estimator 100. The control system 22 sends signals to the antenna arrays 20, receives signals from the antenna arrays 20, and outputs the location of the wireless device 10.

The beam control system 80 sends signals to the antenna arrays 20 to control the scan direction of each array. The scan direction of the arrays is controlled so that the scan beams of the arrays are coordinated and converge at the same volume of space. In the simplified context of FIG. 7, each array 20 is shown with a scan beam 26 having an angular width. The scan beams 26 of the arrays 20 are coordinated by the beam control system 80 to create a scan volume element 23 defined by the overlap of the scan beams 26 of the arrays 20. Thus the entire volume of space to be scanned is comprised of a plurality of such scan volume elements 23. If the arrays 20 are mechanically steered, each scan volume element 23 is scanned sequentially. If the arrays 20 are electrically scanned, all of the volume elements 23 can be scanned in parallel at the same time. If the arrays are electronically scanned, but form only one beam at a time, each scan volume element 23 will be scanned sequentially.

The control system 22 also receives signals from each of the N arrays 20. The signals received from each of the N arrays 20 may include a time series, a beam scan direction, and the location and orientation of each array 20. This data is used by the detector and relative arrival time estimator 90 and location estimator 100 to calculate the position of the wireless device 10. In one embodiment, the time series is received from each array 20, while the beam scan direction, and the location and orientation of each array 20 is calculated by the beam control system 80.

Figure 8:
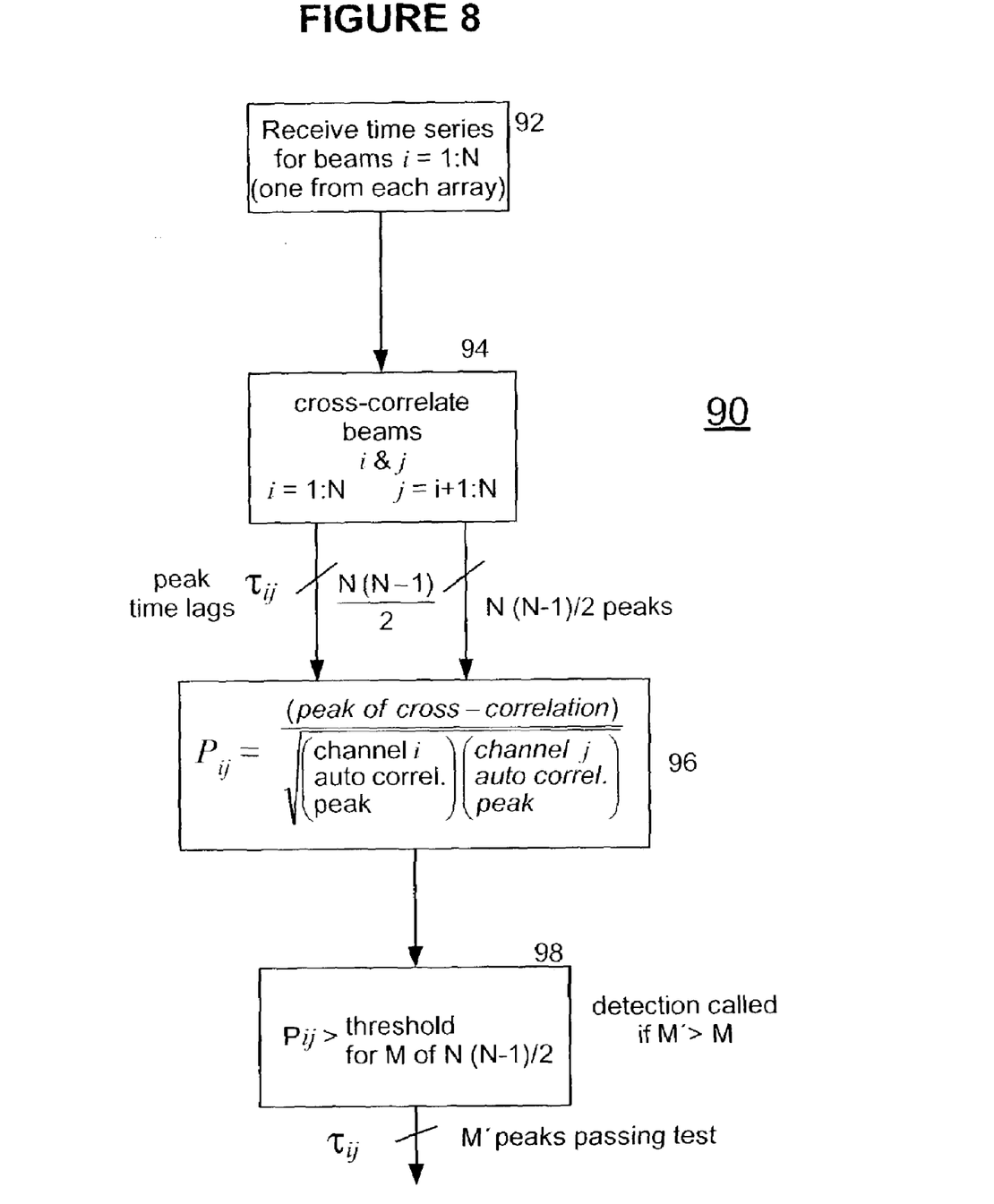
FIG. 8 is a block diagram of a detector and relative arrival time estimator according to the present invention.

The time series, beam scan direction, and location and orientation of each of the N arrays 20 is relayed to the detector and relative arrival time estimator 90 and location estimator 100. The detector and relative arrival time estimator 90 uses the time series data from each of the N antenna arrays 20 to calculate the relative arrival times of signals from a wireless device 10 at each array 20. FIG. 8 is a block diagram of steps of determining detection and relative arrival times used by a detector and relative arrival time estimator 90 according to the present invention. A time series for a beam from each array is received by the detector and relative arrival time estimator (step 92). A time series is the signal received by beam i=1:N over a given period of time. Then, using known techniques, the detector and relative arrival time estimator cross-correlates the time series data from beams i and j, where i=1:N and j=j+1:N (step 94). The result is $\tau_{ij}$, the lag time between the apparent peaks of the time series for i and j. To ensure that $\tau_{ij}$ indeed represents the time lag between peaks, the detector and relative arrival time estimator calculates the coherence, $\rho_{ij}$ (step 96). The coherence, $\rho_{ij}$, is then compared to a threshold for M of the $N(N-1)/2$ $\tau_{ij}$'s (step 98). Detection is called if M', the number of $\tau_{ij}$'s meeting the threshold, is greater than M. The detector and relative arrival time estimator then relays the $\tau_{ij}$'s for the M' peaks passing the test to the location estimator, along with beam scan direction, and location and orientation of each of the N arrays.

Figure 9:
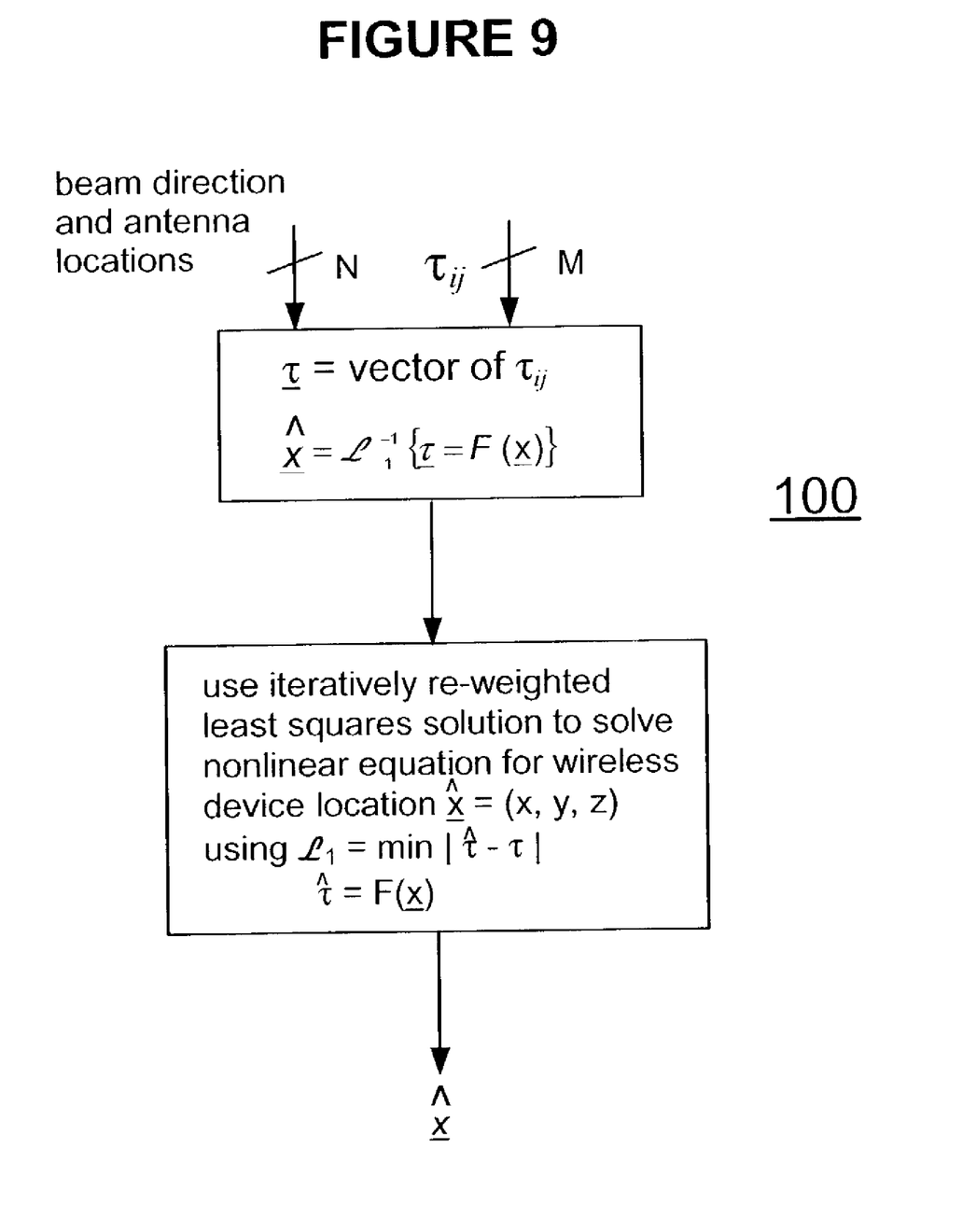
FIG. 9 is a block diagram of a location estimator according to the present invention.

The location estimator 100 applies robust inversion techniques to the relative arrival time data to calculate the position of a wireless device 10. FIG. 9 illustrates a location estimator 100 according to the present invention. An iteratively re-weighted least squares solution is used to solve the nonlinear equation for the wireless device 10 location, $\hat{x}=(x, y, z)$ using $L_1=\min|\hat{\tau}-\tau|$ where $\tau=F(\hat{x})$. Though not shown in FIG. 9 the beam scan direction, and location and orientation of each of the N arrays 20 may be used by the location estimator in at least two ways. First, another data vector, θ corresponding to the angle of arrival can be added to the calculation. Secondly, the beam scan direction and location and orientation data can be used to calculate the centroid of the coordinates of the volume formed by the intersection of the scan beams from each antenna. This position serves as a useful starting solution for the non-linear iterative robust inversion algorithm. The location estimator outputs $\hat{x}$, the location of wireless device 10.

The present invention may also locate and communicate with specialized wireless devices. Specialized wireless devices may include features that identify the person associated with the device, monitor the biological condition of the person associated with the device, allow the person associated with the device to signal his or her condition, or begin transmitting continuously upon receiving a specified RF signal or manual input signal. In other words, the features of the specialized wireless device allow information about the condition or status of the person associated with the device to be transmitted to antennas and other systems of the present invention.

Figure 10:
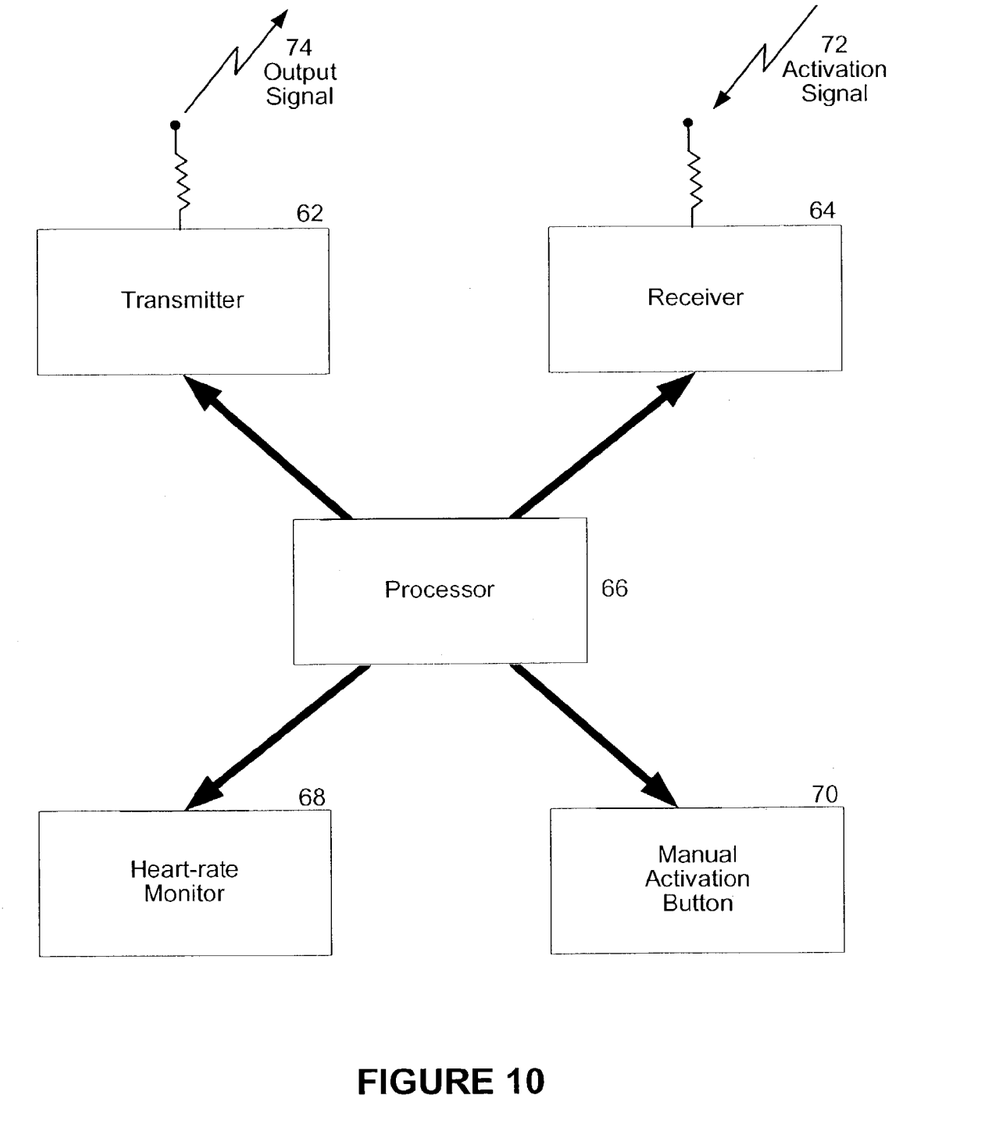
FIG. 10 is an exemplary specialized wireless device according to the present invention.

Referring to FIG. 10, an exemplary specialized wireless device includes a transmitter 62, a low standby-power receiver 64, a processor 66, a heart-rate monitor 68, and a manual activation button 70. The device is essentially off until the low standby-power receiver 64 detects an activation signal 72, which is relayed to the processor 66, which in turn activates the device. This allows the battery in the specialized wireless device to be conserved. It also decreases the minimum number of antennas required from 4 to 3, since emission time is known (because it was commanded by the control system) rather than having to be estimated along with the location. Though any known sensor capable of determining a biological condition of a person may be used, a heart rate monitor 68 is shown by way of example. The heart rate monitor 68 uses known heart rate monitoring technology to sense the heart rate of the owner of the device. The transmitter 62 emits an output signal 74 that enables determination of location by the present invention. The data from the heart rate may also be transmitted as part of the output signal 74. The device may also be activated manually by actuating the activation button 70. The features of the specialized wireless device described with reference to FIG. 10 can be included in a stand alone device or incorporated into existing devices such as mobile phones.

Figure 11:
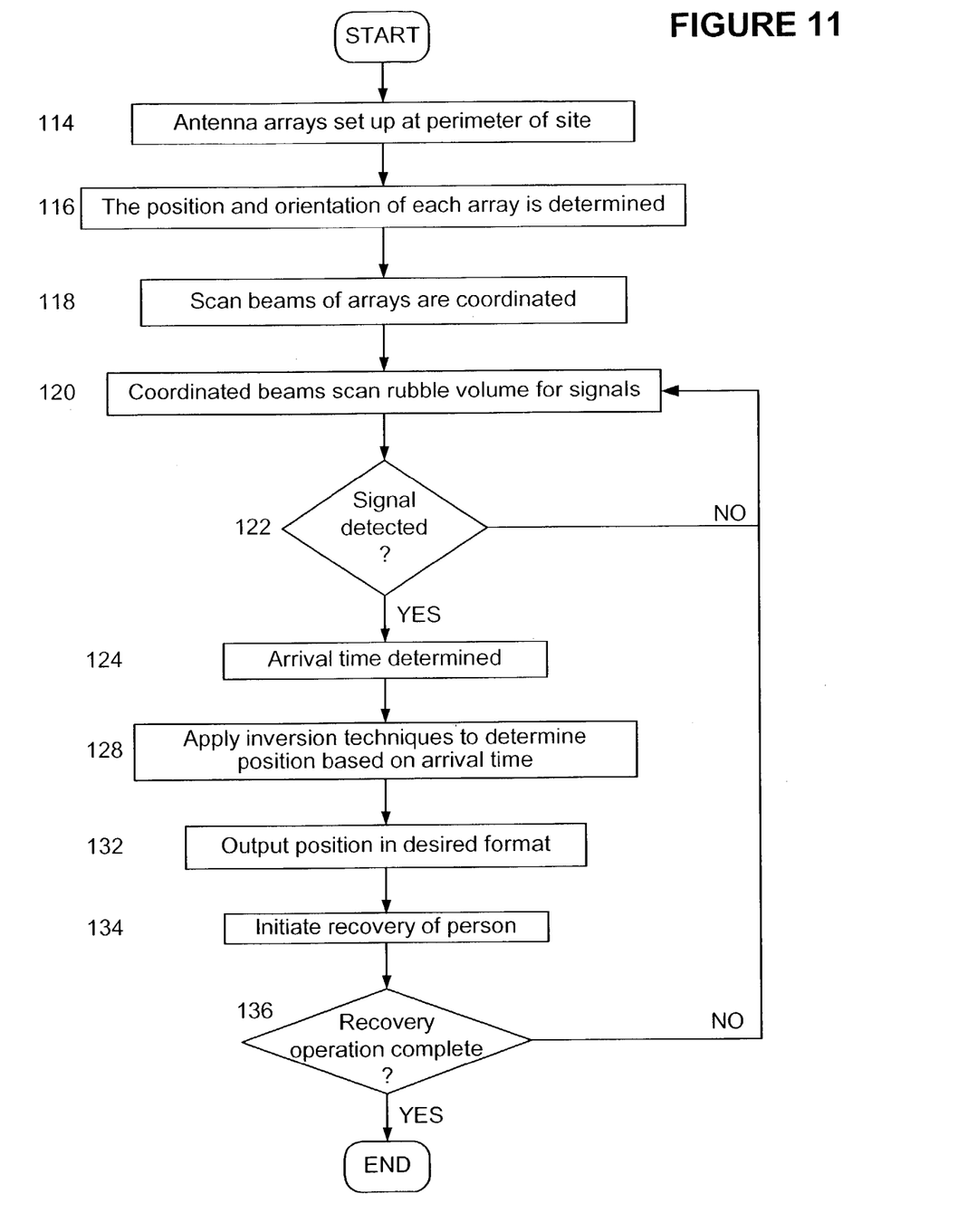
FIG. 11 is a flow diagram of a method showing steps of a search and rescue situation according to the present invention.

The following example, the steps of which are shown in FIG. 11, illustrates some features of the present invention. A building collapses with people inside, leaving them alive, but trapped in spaces within the rubble. Some or all of the people have wireless devices with them. A rapid response team arrives on the scene to implement the present invention.

A plurality of directional receiver antenna arrays are set up at spaced apart locations around the perimeter of the site (step 114). The location and orientation of each array is precisely determined (step 116). For example, the location of each array can be determined using GPS technology embedded within each array and the orientation of each array can be determined by a fluxgate compass embedded in or associated with each array. The control system 22 electronically steers the scan beams of each array 20 and coordinates the beams of the arrays (step 118). Sets of coordinated beams are sequentially scanned or formed in parallel over the rubble volume (step 120). For each scan volume element, the control system determines whether a signal is detected by a significant number of beams (step 122). When an array detects a signal (step 122, YES), the arrival times of the signals are determined (step 124). If no signal is detected (step 122, NO), the scan beams continue to scan the rubble volume (step 120). The control system then applies a minimum absolute value (L1) norm inversion technique to determine a position of the wireless device in three dimensional space (step 128). The determined position can be expressed in reference to the antenna positions, or in absolute terms such as longitude-latitude-altitude (step 132). The position information may then be used to guide rescue crews equipped with GPS or other position measuring equipment in carrying out the rescue operation of the owner of the wireless device (step 134). The system then determines whether the recovery operation is complete (step 136). If the operation is not complete (step 136, NO), the system continues to scan the rubble volume for signals (step 120). If the operation is complete (step 136, YES), the process ends.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for localizing the position of a wireless device comprising:
    providing a plurality of directional antennas capable of receiving signals from the wireless device, wherein each directional antenna produces a scan beam using an adaptive beamformer;
    scanning a volume for a signal from the wireless device using the scan beams of the antennas;
    using a controller to electronically steer the scan beams to converge at a specified location in the volume;
    receiving a signal from the wireless device at a minimum number of antennas;
    determining a time of arrival of the signal for each antenna that received the signal;
    determining the position of the wireless device based on the determined time of arrival data;
    applying robust inversion techniques to the position determination to minimize error in the position determination; and
    controlling the adaptive beamformer of each antenna to ignore or substantially attenuate off-angle delayed multipath signals that fall outside of the scan beams.

2. The method for localizing the position of a wireless device of claim 1, wherein determining the position of the wireless device is further based on the angle of arrival of the signal at each antenna.

3. The method for localizing the position of a wireless device of claim 1, wherein applying robust inversion techniques to the position determination comprises applying a non-linear iteratively re-weighted least squares method.

4. The method for localizing the position of a wireless device of claim 1, further comprising receiving from the wireless device, status information about a person associated with the wireless device.

5. The method for localizing the position of a wireless device of claim 4, wherein the status information is information from sensors monitoring a biological condition of the person.

6. A system for localizing the position of a wireless device comprising:
    a plurality of directional antennas capable of receiving signals from the wireless device, wherein each antenna produces a scan beam using an adaptive beamformer; and
    a control system electronically linked to each of the antennas, wherein the control system is adapted to:
        control the scan beam of each of the antennas to scan a volume;
        electronically steer the scan beams to converge at a specified location in the volume;
        determine a time of arrival at each antenna of a signal from the wireless device;
        determine the position of the wireless device based on the time of arrival at each antenna; and
        apply robust inversion techniques to the position determination to minimize error in the position determination, wherein the control system is further adapted to control the adaptive beamformer of each antenna to ignore or substantially attenuate off-angle delayed multipath signals that fall outside of the scan beams.

7. The system for localizing the position of a wireless device of claim 6, wherein the determination of the position of the wireless device is further based on the angle of arrival of the signal at each antenna.

8. The system for localizing the position of a wireless device of claim 6, wherein applying robust inversion techniques to the position determination comprises applying a non-linear iteratively re-weighted least squares method.

9. The system for localizing the position of a wireless device of claim 6, wherein the antennas are capable of receiving status information about a person associated with the wireless device from the wireless device.

10. The system for localizing the position of a wireless device of claim 9, wherein the status information is information from sensors monitoring a biological condition of the person.

11. A method of localizing the position of a wireless device within a volume comprising:
providing a control system;
providing a plurality of directional antennas, wherein each antenna is capable of creating a scan beam and is linked electronically to the control system, wherein the scan beam of each antenna is produced using an adaptive beamformer;
arranging the plurality of directional antennas near the volume in which the wireless device is located;
determining the position and orientation of each of the directional antennas;
using the control system to electronically steer the scan beams to converge at a specified location in the volume;
scanning the volume with the coordinated beams;
receiving a signal from the wireless device;
determining a time of arrival of the signal at each directional antenna; and
controlling the adaptive beamformer of each antenna to ignore or substantially attenuate off-angle delayed multipath signals that fall outside of the scan beams.

12. The method of localizing the position of a wireless device of claim 11, wherein determining the position of the wireless device is further based on the angle of arrival of the signal at each antenna.

* * * * *